United States Patent [19]
Keller

[11] Patent Number: 4,624,158
[45] Date of Patent: Nov. 25, 1986

[54] LATHE FOR MACHINING BALLOON-SHAPED POCKETS IN A WORKPIECE

[75] Inventor: Bobby R. Keller, Charlotte, N.C.

[73] Assignee: Westinghouse Electric Corp., Pittsburgh, Pa.

[21] Appl. No.: 711,548

[22] Filed: Mar. 13, 1985

[51] Int. Cl.$^4$ ............................................. B23B 5/40
[52] U.S. Cl. ....................................................... 82/12
[58] Field of Search ........................ 82/12, 1.2, 1.4, 1.5

[56] References Cited

U.S. PATENT DOCUMENTS

| | | | |
|---|---|---|---|
| 3,211,896 | 10/1965 | Evans et al. | 82/2 B |
| 3,301,104 | 1/1967 | Matlack | 82/12 |
| 3,966,347 | 6/1976 | Watson | 82/12 |
| 4,453,435 | 6/1984 | Sauerwald et al. | 82/1.4 |

FOREIGN PATENT DOCUMENTS 365854 12/1922 Fed. Rep. of Germany ........... 82/12
239061 12/1945 Switzerland ............................ 82/12

Primary Examiner—Leonidas Vlachos
Attorney, Agent, or Firm—F. J. Baehr, Jr.

[57] ABSTRACT

A lathe for machining a balloon-shaped pocket in a turbine rotor comprising a carriage disposed on ways to move axially along the bed of the lathe, a cross-feed mounted on the carriage, the cross-feed moving toward and away from the axis of the lathe and a tear-dropped shaped tool holder for holding a single-edged cutting tool disposed on the cross-feed in such a manner that the cutting tip of the single-edge tool moves in a circular arc and cooperates with the cross-feed to cut a balloon-shaped pocket in a turbine rotor.

9 Claims, 6 Drawing Figures

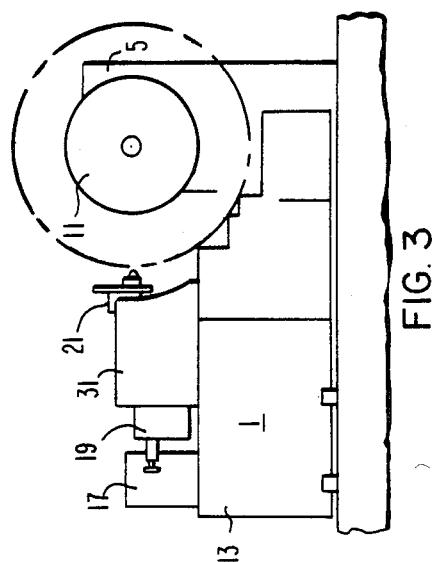
FIG. 3
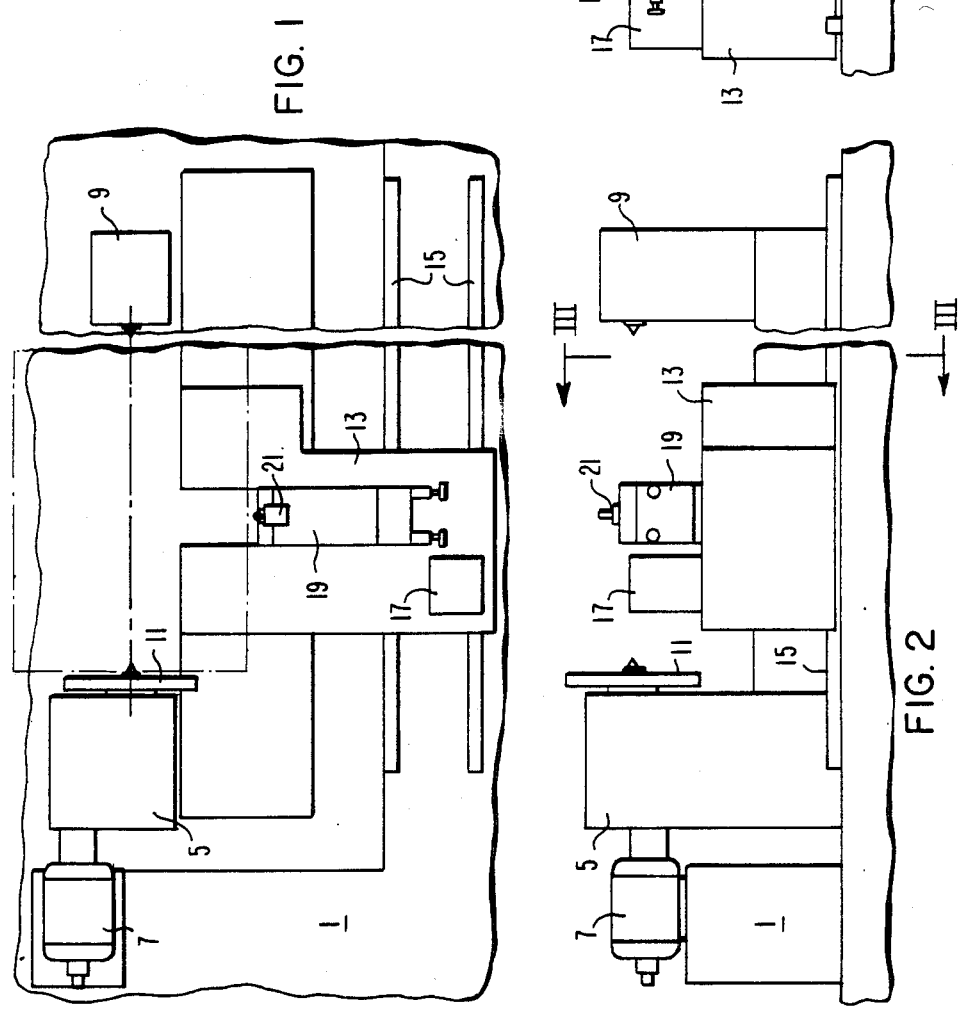
FIG. 1
FIG. 2

LATHE FOR MACHINING BALLOON-SHAPED POCKETS IN A WORKPIECE

BACKGROUND OF THE INVENTION

This invention relates to a lathe and more particularly to a lathe for machining balloon-shaped pockets in a workpiece.

In the manufacture of large integral turbine rotors a plurality of internal balloon-shaped pockets are machined in large diameter forgings to shape the turbine rotor. To machine these pockets 13 different offset tools were utilized to machine just one side of the balloon-shaped pocket and opposite hand tools were required for machining the other side of the balloon-shaped pocket. Thus a total of 26 different offset tools were utilized. Time required for tool changes during the machining was appreciable. Another problem was that every juncture of segments machined by different tools was a stress riser, which required polishing to remove the stress riser. The balloon-shaped pockets were very difficult to machine, particularly because finish requirements precluded any steps, undercuts or chatter marks, which could produce stress risers, which enhance the possibility of stress corrosion, as the environment in which the turbine rotor operates is one which leads to stress corrosion.

SUMMARY OF THE INVENTION

A lathe, when made in accordance with this invention, comprises means for rotating a workpiece about its long axis, a carriage which moves generally parallel to the axis, a cross-feed disposed on the carriage, and a single-edge cutting tool. Disposed on the cross-feed is means for moving the single-edge cutting tool in a circular arc. The lathe also has control means for simultaneously semi-automatically or automatically controlling the carriage along the workpiece axis, for semi-automatically or automatically controlling the cross-feed and for semi-automatically or automatically controlling the means for moving the single-edge cutting tool in a circular arc, whereby a pocket with a balloon-shaped interior portion having a predetermined contour and very good surface finish can be machined in the workpiece.

BRIEF DESCRIPTION OF THE DRAWINGS

The objects and advantages of this invention will become more apparent by reading the following detailed description in conjunction with the accompanying drawings, in which:

FIG. 1 is a plan view of the lathe made in accordance with this invention;

FIG. 2 is an elevation view of the lathe;

FIG. 3 is a sectional view taken on line III—III of FIG. 1;

DESCRIPTION OF THE PREFERRED EMBODIMENT

Figure 4:
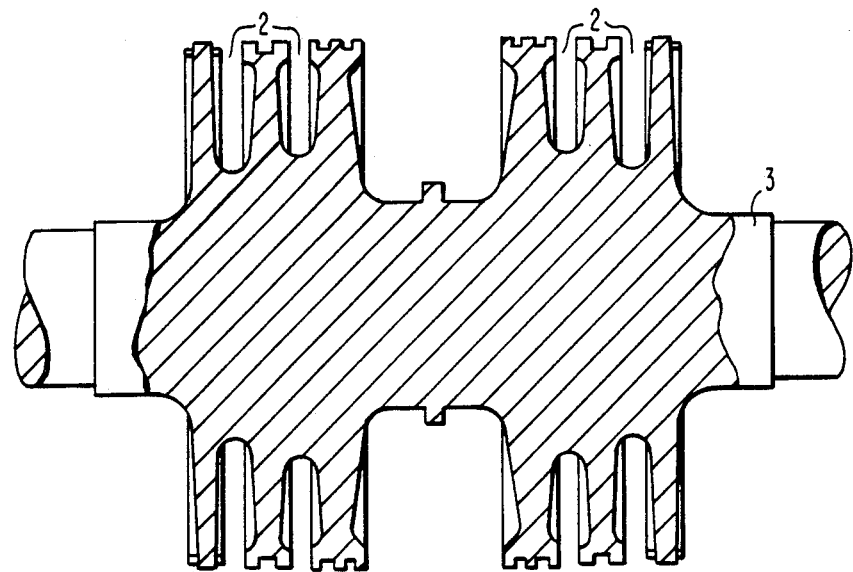
FIG. 4 is a partial sectional view of a steam turbine rotor showing the balloon-shaped pockets which are machined by the lathe.
Figure 5:
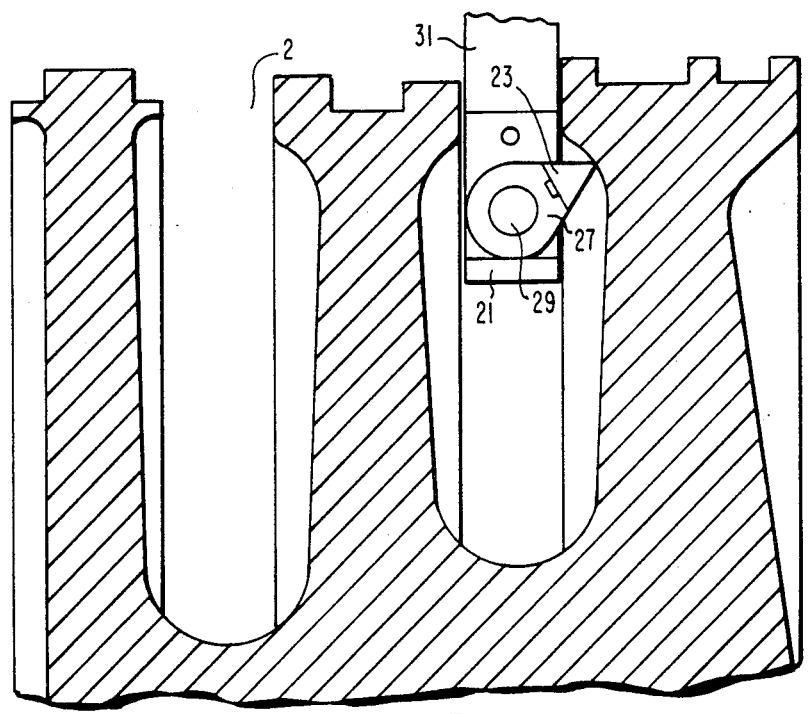
FIG. 5 is an enlarged partial sectional view looking down on a cutting tool within the balloon-shaped pockets.
Figure 6:
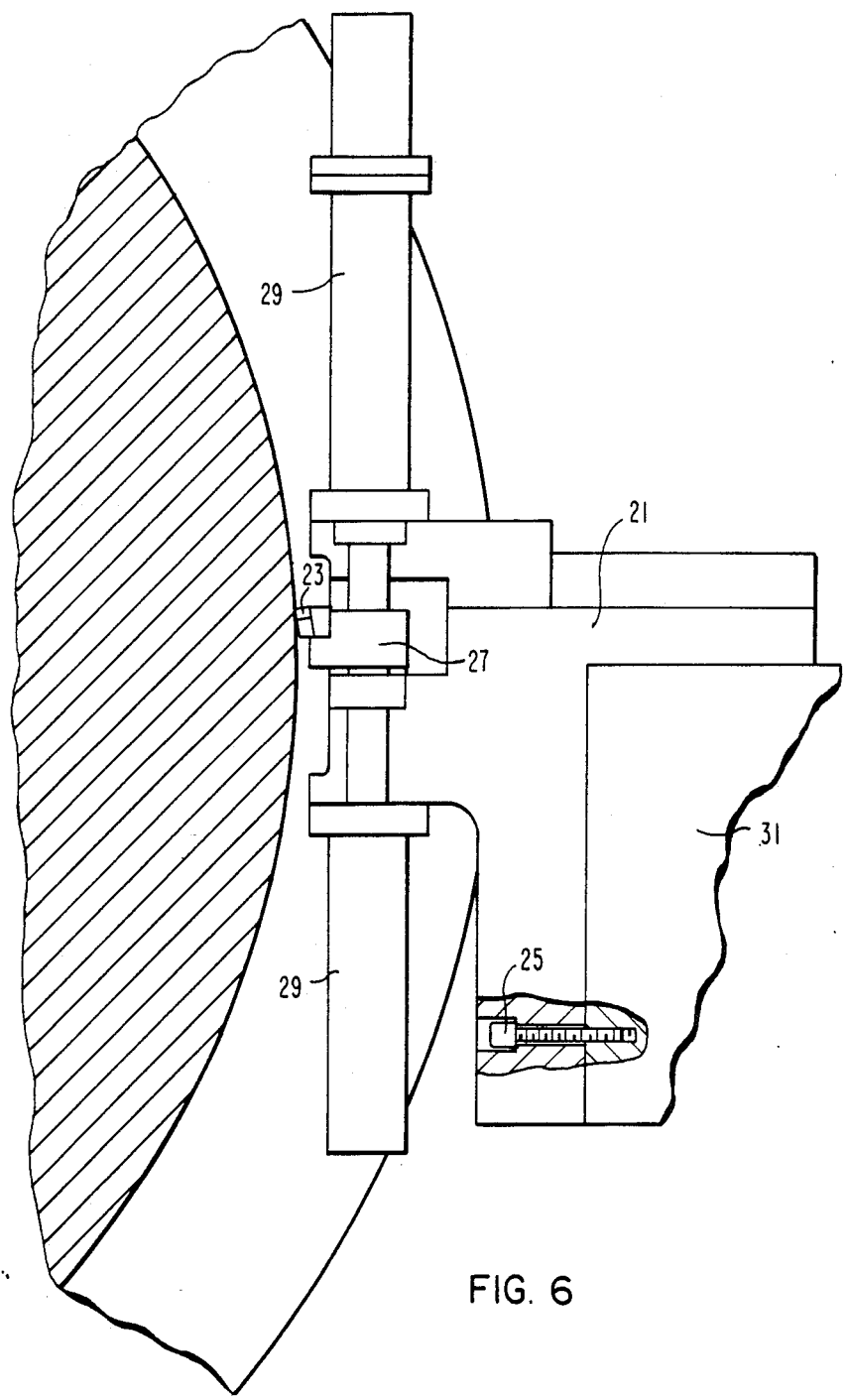
FIG. 6 is an enlarged partial sectional view looking at a cutting tool within the balloon-shaped pocket from one end of the rotor.

Referring now to the drawings in detail and in particular to FIGS. 1, 2 and 3 there is shown a lathe 1 for machining balloon-shaped pockets 2 in a large integral steam turbine rotor 3. The lathe 1 has a gear driven head-stock 5 powered by an electric motor 7 and an axially movable tail-stock 9. The head-stock 5 and tail-stock 9 each have a center for axially aligning a turbine rotor 3 with the axis of the lathe 1. The head-stock 5 has a faceplate 11 with means for rotating the rotor 3 co-axially with the axis of the lathe.

A carriage 13 is disposed on ways 15 to move generally parallel to the axis of the lathe 1. This axially-directed movement is controlled by a controller 17 which moves the carriage 13 semi-automatically or automatically or fixes it at any position along the axis.

Disposed on the carriage 13 is a cross-feed 19 having a narrow, deep, long slide 31 which generally moves with the cross-feed. The controller 17 controls the movement of the cross-feed 19 toward and away from the axis semi-automatically or automatically. The cross-feed may also be fixed at any position.

Mounted on the cross-feed slide 31 is a tool holder 21 for a single edge triangular or round shaped cutting tool 23 made of tungsten carbide or other material. The tool holder 21 is adapted to move the cutting edge of the single-edge cutting tool 23 in a circular arc generally greater than 180° and less than 360°.

The tool holder 21 comprises a generally T-shaped base which is fastened to the cross-feed slide 31 by machine screws 25 or other means extending through the stem and one portion of the cross member. The other portion of the T-shaped base is made heavier and a tear drop-shaped plate 27, with the single-edge cutting tool 23 mounted on the pointed end thereof, is disposed in a pocket 28 to rotate about an axis normal to the tear drop-shaped plate 27 and passing through the center of the circular portion thereof. Small-diameter hydraulic motors or other drive means 29 are connected to the tear drop-shaped plate 27 to rotate the plate in a circular arc, causing the single-edge cutting tool to rotate in a circular arc. The controller 17 operates the drive means 29 semi-automatically or automatically to move the tear drop-shaped plate 27 to control the movement of the single-edge cutting tool 23 as it moves in a circular arc. The controller 17 can operate the cross-feed 19 and drive means 29 simultaneously or serially to provide small, incremental movement of the cutting tool 23 to cause the cutting tool to follow a predetermined path to machine a balloon-shaped pocket with a very good surface finish in an integral turbine rotor.

What is claimed is:
1. A lathe comprising:
   means for rotating a workpiece about an axis;
   a carriage which moves generally parallel to said axis;
   a cross-slide disposed on said carriage;
   a cross-feed disposed on said carriage;
   a tool holder on said cross-slide;
   a single-edge cutting tool in said tool holder;
   a drive motor disposed on said cross-slide for moving said single-edge cutting tool in a circular arc while the cutting tool is cutting;
   said drive motor having a drive shaft the axis of which is coincident with the axis of the circular arc and said drive motor being directly connected to said cutting tool eliminating lost motion between said drive motor and said cutting tool;

means for generally fixing said carriage at any position along said axis;

means for controlling the cross-slide; and means for controlling the drive motor for moving the single-edge cutting tool in a circular arc, whereby pockets with a balloon-shaped interior having predetermined shapes and a very good surface finish can be machined in the workpiece.

2. A lathe as set forth in claim 1, wherein the circular arc through which the single edge cutting tool moves, while the cutting tool is cutting is greater than 180° and less than 360°.

3. A lathe as set forth in claim 1, wherein the single-edge cutting tool is mounted on a generally tear drop-shaped rotatable plate having a generally round portion and a pointed portion with the single-edge cutting tool mounted on the pointed portion.

4. A lathe as set forth in claim 3, wherein the drive motor for moving the single-edge cutting tool has an oscillatable shaft and the round portion of the tear drop-shaped plate is concentrically disposed on said shaft.

5. A lathe as set forth in claim 4, wherein the cross-feed comprises a narrow, deep, long member which moves toward and away from said axis and the drive motor for moving the single-edge cutting tool in a circular arc is disposed on the distal end thereof.

6. A lathe as set forth in claim 1, wherein the cross-feed comprises a narrow, deep, long member which moves toward and away from said axis and the drive motor for moving a single-edge cutting tool is in a circular arc is disposed on the distal end thereof.

7. A lathe as set forth in claim 4, wherein the drive motor with an oscillatable shaft is a hydraulic motor.

8. A lathe as set forth in claim 1, wherein the means for controlling the cross-feed and means for controlling the motor drive for moving the single-edge cutting tool in a circular arc have semi-automatic and automatic modes of operation and when in automatic mode the controlling means cooperate to move the cutting tool small incremental distances along a predetermined path to machine one side of the balloon-shaped interior portion of the pocket at a time.

9. A lathe as set forth in claim 8, wherein the means for controlling the cross-feed also controls the direction, distance of travel and velocity of the cross-feed.

* * * * *